United States Patent [19]

Argabright et al.

[11] 3,720,632

[45] March 13, 1973

[54] POLYISOCYANURATE-CONTAINING ELASTOMERS AND FOAMS

[75] Inventors: Perry A. Argabright, Sedalia, Colo.; Vernon J. Sinkley, Invergrove, Minn.; Brain L. Phillips, Littleton, Colo.

[73] Assignee: Marathon Oil Company, Findlay, Ohio

[22] Filed: Sept. 30, 1970

[21] Appl. No.: 76,975

Related U.S. Application Data

[60] Continuation-in-part of Ser. No. 840,843, July 10, 1969, abandoned, which is a division of Ser. No. 611,588, Jan. 25, 1967, Pat. No. 3,458,448.

[52] U.S. Cl. ..........260/2.5 AW, 260/30.2, 260/30.6, 260/32.4, 260/32.6, 260/34.2, 260/77.5 NC
[51] Int. Cl. .....C08g 22/44, C08g 22/22, C08q 22/28
[58] Field of Search................260/2.5 AW, 77.5 NC

[56] References Cited

UNITED STATES PATENTS

| | | | |
|---|---|---|---|
| 3,631,000 | 12/1971 | Argabright et al. | 260/77.5 |
| 3,511,813 | 5/1970 | Argabright et al. | 260/77.5 |
| 3,517,002 | 6/1970 | Heiss | 260/248 |
| 3,573,259 | 3/1971 | Argabright et al. | 260/77.5 |
| 3,437,500 | 4/1969 | Hennig et al. | 106/252 |
| 3,284,413 | 11/1966 | Heiss | 260/77.5 |
| 3,278,492 | 10/1966 | Herbstman | 260/77.5 |
| 3,294,753 | 12/1966 | Beitchman et al. | 260/77.5 |
| 3,516,950 | 6/1970 | Haggis | 260/2.5 |
| 3,577,391 | 5/1971 | Argabright et al. | 260/77.5 |

FOREIGN PATENTS OR APPLICATIONS

| | | | |
|---|---|---|---|
| 6,515,058 | 5/1966 | Netherlands | 260/77.5 NC |
| 1,478,759 | 4/1967 | France | 260/2.5 AW |

*Primary Examiner*—Donald E. Czaja
*Assistant Examiner*—H. S. Cockeram
*Attorney*—Joseph C. Herring, Richard C. Willson and Jack L. Hummel

[57] ABSTRACT

Polyisocyanate compounds containing isocyanurate rings are formed by reacting an organic dichloride with a metal cyanate in the conjoint presence of a halide catalyst and an aprotic solvent.

The present invention also comprises new isocyanurate-containing isocyanate compositions. Both the new and conventional isocyanates produced by the processes of the present invention are useful for the wide variety of uses to which isocyanates are conventionally put, including particularly the manufacture of polyurethane polymers in the form of coatings, films, foams, etc.

9 Claims, No Drawings

POLYISOCYANURATE-CONTAINING ELASTOMERS AND FOAMS

CROSS REFERENCES TO RELATED APPLICATIONS

This application is a continuation-in-part of our copending U.S. Pat. application Ser. No. 840,843 filed July 10, 1969 now abandoned, which is a divisional of U.S. Pat. application Ser. No. 611,588 filed Jan. 25, 1967, now U. S. Pat. 3,458,448.

SUMMARY

Polyisocyanates, particularly tolylene diisocyanate (TDI), are widely used in the production of urethane polymers as coatings, films, and foams, and for other purposes. Urethane polymers offer advantages wherever superior resistance to abrasion, acids, alkalis and weather is required. A significant disadvantage of presently available urethane compositions has been their tendency to discolor and degrade when exposed to sun-light and the elements.

The present invention permits the production of new isocyanates in which the nitrogen of the isocyanate radical ($-N=C=O$) is not attached to an aromatic ring. It has been discovered that polymers derived from isocyanates having this special molecular characteristic are markedly less subject to degradation and discoloration than are the polymers produced from conventional isocyanates in which the nitrogen is attached to an aromatic ring. In addition, the present invention permits the production of polyisocyanates which automatically contain at least about 0.1 and preferably from 10 to about 75 mole percent (based on the total moles of nitrogen in the compositions) of isocyanurate groups which have been discovered to lend additional stability and resistance to degradation of finished polymers.

In addition to the superior properties of the finished polymers produced from the isocyanates of the present invention, the invention offers distinct economic advantages in that the production of these superior polyisocyanates is accomplished in a single step reaction which minimizes operating costs, required equipment and related capital investment.

In general, the invention involves the production of polyisocyanates through the reaction of an organic dichloride with a metal cyanate in the presence of a metal halide, preferably an iodide or bromide using an aprotic solvent as defined herein. The overall reaction may be generally summarized as follows:

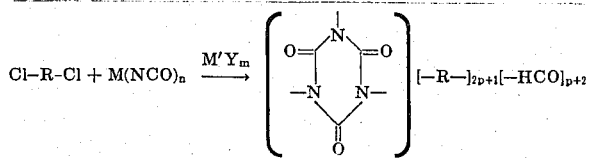

R = Divalent alkyl, divalent aralkyl, divalent allyl or substituted derivatives, especially lower alkyl, for example:

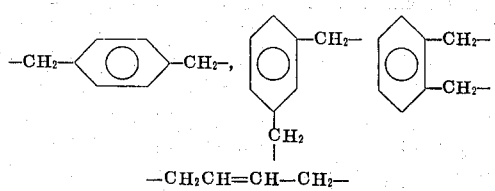

$-CH_2CH=CH-CH_2-$

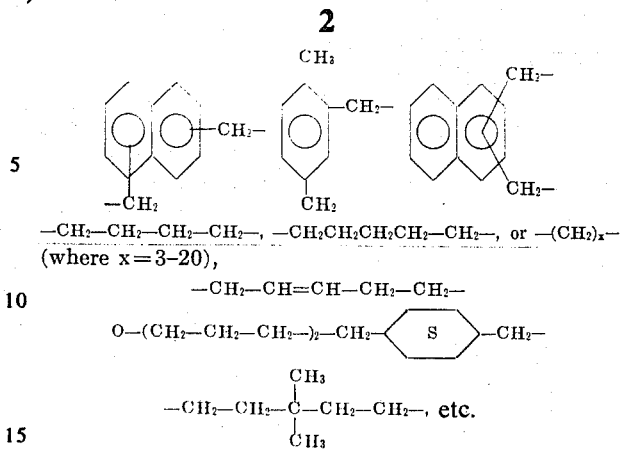

$-CH_2-CH_2-CH_2-CH_2-$, $-CH_2CH_2CH_2CH_2-CH_2-$, or $-(CH_2)_x-$ (where x=3-20), $-CH_2-CH=CH-CH_2-CH_2-$ $O-(CH_2-CH_2-CH_2-)_2-CH_2-\langle S \rangle-CH_2-$ $-CH_2-CH_2-\underset{CH_3}{\overset{CH_3}{C}}-CH_2-CH_2-$, etc.

M= alkali or alkaline earth metal, for example; Li, Na, K, Rb, Cs, Be, Mg, Ca etc.
n= Oxidation number of metal
M'= A metal, preferably an alkali or alkaline earth metal.
Y= A very reactive nucleophile, for example; I or Br
m= Oxidation state of the metal, M'.

Speaking in terms of molecular configuration, p may be varied from 0 to over 15, but will be from 2 to about 6 in order to produce the desirable isocyanurate-containing polyisocyanates of the present invention. The value of p may be controlled by utilizing greater or lesser concentrations of the halide catalyst as discussed hereafter.

By aprotic solvents is meant compositions which are liquid under the conditions of the reaction, which have a high dielectric constant, (greater than about 15 at 25° C), which are dipolar, that is, one part of the molecule has a more positive electrical charge relative to the other parts of the molecule causing the molecule to act as a dipole, are sufficiently inert not to enter into deleterious side reactions to a significant degree under the reaction conditions, and which do not possess hydrogen atoms capable of hydrogen bonding with or transferring to anions in solution in the reaction mixture. The aprotic solvent can be composed of a mixture of liquids so long as the over-all liquid compositions meet the above criteria. Preferred among the aprotic solvents are N-alkyl pyrrolidones, dialkyl formamides (e.g., N, N-dimethylformamide (DMF)), N, N-dimethylacetamide, acetonitrile, N-alkylpyrrolidones, hexaalkylphosphoramides, and tetraalkylureas, especially those in which the alkyl groups are methyl groups. The most preferred solvent for the reaction of the present invention is dimethyl formamide. Preferably from about 5 to about 100 and most preferably from about 10 to about 50 moles of the solvent will be present for each mole of dihalide starting material.

The ratio of NCO to chlorine in the dichloride is preferably from 0.8 to about 1.5 and most preferably from 1.00 to about 1.10.

As mentioned previously, the value of p can be varied by varying the amount of catalyst employed in the reaction mixtures of the present invention. For example, at reflux in DMF, p will average approximately 1 in the product mixture when the concentration of the halide catalyst is about 0.10 to 0.15 moles of halide in the catalyst per mole of chlorine in the dichloride. p will generally average above about 2 when from about 0.01 to 0.05 moles of halide in the catalyst are present for each mole of chlorine in the dichloride. Different solvents and temperatures will somewhat change the average values of $p$, and intermediate values of catalyst concentration will give intermediate average values of $p$. For most polyisocyanates which are to be used in the production of urethane polymers an average value of $p$ of from about 0.5 to about 2.5 will be preferred, with values of from above 1.0 to about 2.0 being most preferred. Correspondingly, catalyst concentrations of from 0.02 to about 0.25, and more preferably 0.05 to about 0.15 moles of halide in the catalyst per mole of chlorine in the dichloride will be used in producing isocyanates for urethane production.

For purposes of this invention, the dichloride is taken from the class of trans $Cl-CH_2-CH=CH-CH_2Cl$

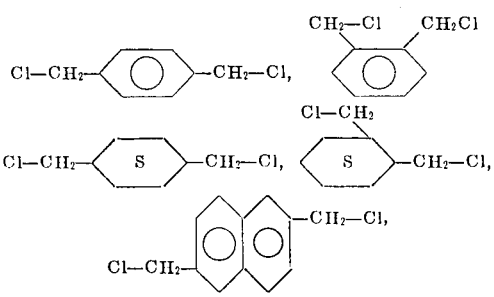

and the dichlorides of tetramethylene, pentamethylene, hexamethylene, heptamethylene, octamethylene, etc., or lower alkyl derivatives thereof, which are free from substituents which interfere with the reaction of the present invention.

Trans $Cl-CH_2-CH=CH-CH_2-Cl$,

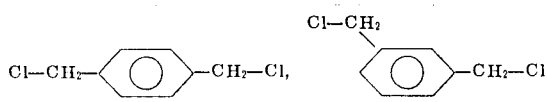

and the dichlorides of hexamethylene, and their substituted derivatives are preferred.

The reaction of the present invention is preferably conducted at a temperature of from about 25° to about 300° C and most preferably at from 50° to about 150° C. Pressure is not critical and may be from below 1 atmosphere to over 10,000 psig. In most cases, it will be preferable to conduct the reaction in the absence of air on a batch-type basis, although flow systems may be utilized. The most convenient apparatus will, in most cases, be a conventional tight-lid varnish cooker or similar reactor having a reflux condenser, provision for agitation, and the usual controls for temperature and pressure.

The actual products of the present invention will, in most cases, be mixtures of specific compounds which will vary in their molecular configurations somewhat as the value of $p$ is increased. For example, when $p$ averages slightly above 1, compositions having the following molecular configurations will predominate (with the sub groups being as previously defined):

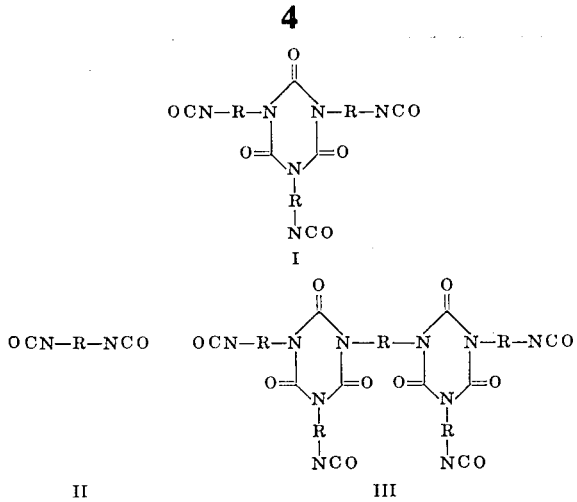

When $p$ is increased to about 2, the following compounds will predominate:

I, III, and

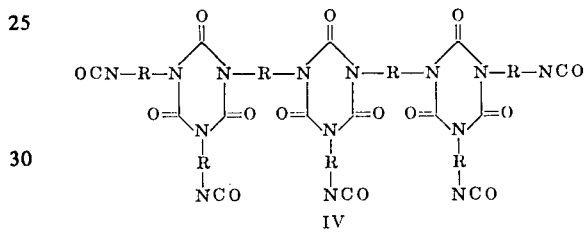

IV

Even more complex compounds will predominate when $p=3$ or above.

In general, commercial grades of starting materials will be satisfactory for the reactions of the present invention, but anhydrous starting materials (containing less than about 1 percent and preferably less than about 0.5 percent by weight of water) will be preferred.

The trademarks used herein can be defined as follows:

| | |
|---|---|
| (A) Multron R-18 | Viscous, colorless-to-light yellow, synthetic polyester resin having specific gravity approximately 1.19, corrected hydroxyl number of 57–63, acid no. 1.5 (max.), flash point (open cup), 570°F. (approx.), fire point (open cup), 635°F. (approx.), used primarily in flexible urethane foams, coatings, and adhesives. A product of Mobay Chemical Co. |
| (B) Witco Fomrez 77-86 | Polyester coupling agent for the production of flexible urethane foams manufactured by Witco Chemical Co. |
| (C) Thanol R-350-X | Clear, reddish-brown liquid substantially free of foreign matter, new polyol for production of rigid urethane foams by one-shot techniques, more fully described in Jefferson Chemical Co. Inc. Advance Data Sheet dated July 19, 1965. |
| (D) Silicone Oil | A generic term for a line of heat-stable, organo-silicon oxide polymers made by combining silicon dioxide with methyl or ethyl groups of molecules derived from alcohols, or with ethylene chloride or phenol. Produced by Union Oil Co. |

| | |
|---|---|
| (E) Multron R-12 | A polyester resin in the form of a viscous, light-brown liquid containing 100% solids and used primarily in the formulation of urethane foams, adhesives and service coatings, specific gravity of 1.13 (approx.); corrected hydroxyl no. of 158–175; acid no. 4.0 (max.); flash point (open cup), 510°F. (approx.) fire point (open cup), 565°F. (approx.). A product of Mobay Chemical Co. |
| (F) Wyandotte Pluracol P-410 | The trade mark applied to polyoxyalkylene glycols of relatively high molecular weights, particularly useful as emulsifying, thickening, dispersing, binding, lubricating, and plasticizing agents, specifically P-410 is a Diol with secondary OH having a basic functionality of 2 hydroxyl number. A Wyandotte Chemicals product. |
| PAPI | Polyphenyl polymethylene polyisocyanate, undistilled, produced by Carwin Chemical Co., Upjohn Co. |
| (H) Voranol RS-410 | An intermediate for the manufacture of urethane elastomers, coatings, and flexible foams, produced by Dow Chemical Specifically Voranol RS-410 has an OH equivalent weight of 135, an avg. mol.wt of 1080 and a hydroxyl number of 410. |
| (I) Poly-G 435 DM | A polyethylene glycol having an OH number of 435 mg. KOH/g. A product of Olin-Mathieson Chem. Corp. |
| (J) Freon 11B | Trichloromonofluoromethane, $CCl_3F$, having a molecular weight of 137.38, 23.7°C B.p. at 1 atm.;–111°C M.p.; critical temp. of 198.0°C; and critical press. of 635 lb./sq.in.abs. Specifically "B" contains $CCl_3F$ plus an inhibitor. A DuPont Company product. |
| (K) Dabco R-8020 | Triethylenediamine-urethane foam catalyst-relatively weak base, but much more active catalytically than appreciably stronger bases. Produced by Houdry Process & Chemical Co. |
| (L) Niax Catalyst D-22 | $(C_4H_9)_2 Sn (OCOC_{10}H_{20}CH_3)_2$ A product of Union Carbide Corp. |
| (M) Surfactant 195 | A silicon-glycol copolymer produced by Dow Corning. |
| (N) Polypropylene glycol 1025 | NIAX Polyol PPG-1025. A product of Union Carbide |
| (O) Spenkel M-21 | A moisture-curing polyurethane prepolymer developed primarily for optimum appearance, application characteristics, and max. service. A product of Textron Inc. |
| (P) Spenkel F-77 | A series of polyurethane coatings, F-77-60 MS. is similar to F-77-50X, except that the solvent is mineral spirits, the % nonvolatile is ±1, and the specific gravity is 0.912–0.932. A Textron product. |
| (Q) Fomrez No. 50 | A polyester for the production of flexible urethane foams. A product of Witco Chemical Co. |
| (R) Silicone Surfactant | A generic term for a line of heat-stable, organo-silicon oxide polymers made by combining silicon dioxide with methyl or ethyl groups of molecules derived from alcohols, or with ethylene chloride or phenol. Specifically "L-5340" has a specific gravity of 1.053 (25°/25a/C.). A product of Union Carbide. |
| (L-5350 (S) EMI-24 | 2-ethyl-4-methyl-imid-azole; a curing agent for epoxy resins used in low proportions thus improving chemical resistance. |

The invention will be better understood by reference to the examples which follow. These are intended to be illustrative of the invention and should not be construed as limiting it in any manner. It should be understood that substituents and incorporations in the above mentioned starting materials can be made without departing from the spirit of the invention. The invention is susceptible to a wide variety of variations and modifications which will become obvious to those skilled in the art upon a reading of the present application, and all such obvious variations and modifications are to be taken as being within the scope of the claims appended hereto.

EXAMPLE I

A mixture of 26.36 g (0.40 mole) NaNCO, 11.9 g (0.1 mole) KBr, and 200 ml DMF (purified via distillation from $CaH_2$) is brought to reflux in a 500 ml flask equipped with a reflux condenser, stirrer, thermometer, and means for maintaining a $N_2$ atmosphere. 35.0 g (0.2 mole) p-xylylene dichloride is added and the reaction is held at 145°– 150° C for 20 minutes. The reaction is then cooled very rapidly and the reaction mixture filtered cold (10° C). The DMF is flashed off under vacuum at 60° C and the residue mixed with benzene. The undissolved salts are filtered off, and the benzene is removed from the filtrate to yield 39 g of a clear yellow oil. Both infrared and NMR spectra of the oil confirm the presence of isocyanurate and isocyanate groups. Quantitative analysis for the latter indicates 6.0 meq free NCO/g, equivalent to an average $p$ of 0.69.

EXAMPLES II – VII

The following examples are set forth to illustrate the effect catalyst (bromide) concentration on the isocyanate content of the resulting products. Reaction conditions and reactants are identical to those used in Example I.

CATALYST [a]

| Ex. | %KBr | %NaBr | free NCO (meg/g)[b] | p average |
|---|---|---|---|---|
| II | 15[c] | — | 5.9 | 0.73 |
| III | 10 | — | 4.9 | 1.28 |
| IV | 5 | — | 4.1 | 2.27 |
| V | 1 | — | insoluble product[d] | — |
| VI | 0 | — | insoluble product[d] | — |
| VII | — | 15 | 6.8 | 0.46 | a. based on organic chlorine
b. determined by infrared analysis
c. solubility limit of KBr corresponds to catalyst level between 10–15 mole percent
d. these results demonstrate the need for the catalysts of the present invention.

EXAMPLE VIII

A mixture of 2.98 g KBr (0.025 mole), 13.0 g NaNCO (0.20 mole) and 17.5 g p-xylylene dichloride (0.10 mole) in 250 ml DMF was heated at 100° C for 2.5 hrs with good stirring. The product (light yellow oil) was isolated in the same manner as described in Example I. A quantitative infrared analysis shows the product to contain 4.2 meq/g of free isocyanate groups, equivalent to an average $p$ of 2.08.

EXAMPLE IX

A mixture of 6.64 g KI (0.04 mole), 26.0 g NaNCO (0.40 mole) and 35.0 g p-xylylene dichloride (0.20 mole) in 750 ml of DMF was heated at 100° C for 1.5 hours with good stirring. The yellow oil (isolated as in Example I) contains 4.7 meq/g of free NCO groups (infrared analysis), equivalent to an average $p$ of 1.46.

EXAMPLE X

A mixture of 37.8 g (0.2 mole) of bis (chloromethyl) toluene, 27.7 g (0.42 mole) of NaOCN, 6.18 g (0.06 mole) of sodium bromide, and 200 ml of DMF was held at reflux for ten minutes under $N_2$ with good stirring. The polyisocyanate product (isolated by the procedure of Example I) is a light yellow oil containing 5.9 meq/g of free isocyanate groups, equivalent to an average $p$ of 0.58.

EXAMPLES XI – XIV

The following examples illustrate the use of the new isocyanates of the present invention in the new and novel polyurethanes suitable for the preparation of foams (rigid and flexible), uralkyd coatings, moisture cure coatings, castable elastomers, and adhesives. These are produced according to the general principles of urethane technology which are well known and mentioned in many standard references and United States patents, e.g., Saunders, J. H. and Frisch, K. C., High Polymers XVI Polyurethanes: Chemistry and Technology (Parts 1 and 2), 1st ed., Interscience Publishers, Easton Pa., 1962. Briefly, the isocyanurate-containing isocyanates of the present invention are reacted with an active hydrogen compound, i.e., a compound which gives a positive Zerewittenoff test. "Active hydrogen compounds" as used herein, means such compounds having active hydrogens and a positive Zerewittenoff test including polyamines, polyalcohols, polyamides, polyurethanes (the N-connected hydrogens become active at high temperatures), polybiurets, polymercaptans, and polycarboxylic acids, and, most preferred, polyethers and polyesters. Some of the preferred active hydrogen compounds, catalysts and most preferred active hydrogen compounds, catalysts and most preferred blowing agent, trichloromonofluoromethane, are discussed in U. S. Pat. No. 3,280,205. Examples of preferred active hydrogen compounds are:

Polyamine
ethylene diamine
diethylene triamine
p-phenylene diamine
Polyol (polyalcohol)
ethylene glycol
polyethylene glycol
glycerol
Polycarboxylic Acid
adipic acid
terephthalic acid
maleic acid
Polyamide
adipamide
succinamide
isophthalamide
Polyurethane
dimethyl carbamate of p-phenylene diisocyanate
diethyl carbamate of hexamethylene diisocyanate
dimethyl carbamate of m-xylylene diisocyanate
Polymercaptan
ethylene dithiol
hexamethylene dithiol
1,3-propane dithiol

EXAMPLE XI

One-Shot Foam Formulation (parts by wt)

| | |
|---|---|
| Multron R-18 | 100 |
| N-Methylmorpholine | 2.5 |
| Water | 2.5 |
| Stannous Octoate | 0.4 |
| Wittco Fomrez 77-86 | 3.0 |
| Polyisocyanate* | 62.6 |

* from Example VII. Isocyanate content = 6.77 meg/g.

The polyester, stannous octoate, and Wittco 77–86 are mixed in a container. The water and N-methylmorpholine are mixed, added to the container, and stirred in. The polyisocyanate is stirred in and the foam is allowed to rise and set for ½ hour. Baking at 80° C for one hour yields a white flexible foam, density 5.7 lb/ft³.

EXAMPLE XII

A flame-retardant rigid foam is prepared as follows:

One-Shot, Flame-retardant, Rigid Foam

| | |
|---|---|
| Component A: | |
|    Thanol R-350-X (Jefferson Chem.) | 100 |
|    Fluorotrichloromethane | 24 |
|    Silicone Oil (Union Carbide L-55) | 2.0 |
|    N-Methylmorpholine | 0.2 |
| Component B: | |
|    Polyisocyanate (from Example II, NCO content 5.9 meg/g) | 145 |

Component B is weighed into a mixing container and component A is added. The mixture is stirred for a minute and then poured into a mold to rise. The foam is aged 24 hours at room temperature and then demolded. The density of the product is 9.2 lb/ft³.

EXAMPLE XIII

Adhesive from an Isocyanurate-Containing Polyisocyanate

An isocyanurate-containing polyisocyanate is prepared from di(chloromethyl) toluene by a procedure similar to that of Example X. The product has a free isocyanate content of 5.27 meq/g, equivalent to an average $p$ of 0.83.

A polyester polyurethane adhesive is prepared by mixing 1.1 parts of the above polyisocyanate with 1.0 parts of Multron R-12 (Mobay Chemical Company). After deaeration the adhesive is ready for use.

A similar adhesive is prepared by mixing Mondur CB-75 (75 percent solution of the adduct of 1 mole of trimethylol propane with 3 moles of tolylene diisocyanate) with a 75 percent solution of Multron R-12 in the ratio of 2 parts CB-75 to 1 part R-12.

Each adhesive is applied to steel panels which are pressed 1 hour at 180° C and 50 psi to form lap shear joints with a ½ inch overlapped bonded area. In the case of the CB-75 adhesive, the solvents must be allowed to evaporate over a 4 hour period before pressing.

The isocyanurate-containing polyisocyanate derived adhesive provides a significant improvement in the tensile shear strength of the bond between panels as is shown by the following data.

| Polyisocyanate Component | Tensile Shear Strength of Polyester Polyurethane Adhesive Between Steel Panels | |
|---|---|---|
| | 23°C | 100°C |
| Mobay Mondur CB-75 | 2590 psi | 458 psi |
| Isocyanurate-containing Polyisocyanate | 3410 psi | 525 psi |

EXAMPLE XIV

Elastomer Prepared from Isocyanurate-Containing Polyisocyanate

A cast elastomer is prepared from the isocyanurate-containing polyisocyanate used in the previous example as follows:

1. 1 equivalent of the polyisocyanate, 1.0 equivalent of Wyandotte Pluracol P–410 poly(oxypropylene) glycol, and 0.025 wt percent stannous octoate are mixed at 120° C and deaerated by heating and stirring under vacuum. The mixture is poured into preheated sheet molds consisting of Teflon coated plates separated by 1/16 inch gaskets. The elastomer is gelled 1 hour at 120° C and cured 20 hours at 105° C. A control elastomer is prepared by replacing the isocyanurate-containing polyisocyanate with 1.0 equivalent of Upjohn PAPI. The superior properties of the elastomer derived from the isocyanurate-containing polyisocyanate are substantiated by the test data below:

A. Hardness

Shore Durometer Hardness of Polyurethane Elastomer

| Polyisocyanate | Shore A-2 | Shore D |
|---|---|---|
| | 0/10 | 0/10 |
| Upjohn PAPI | 98/96 | 66/51 |
| Isocyanurate-polyisocyanate | 82/65 | 32/19 |

The hardness is measured according to ASTM D676 and D1484 on the Shore Durometer A–2 and D-scales, taking readings at both 0 and 10 seconds. The PAPI casting is stiff while the isocyanurate-containing polyisocyanate derived material is seen to be softer and more elastomeric.

B. Resilience

| Polyisocyanate | Rebound |
|---|---|
| Upjohn PAPI | 42.2% |
| Isocyanurate-Polyisocyanate | 19.5% |

The resilience data are obtained according to ASTM D1564-64T modified by dropping a 16.1-gram 0.624-inch ball from a height of 18 inches onto a ¼ inch layer of the polyurethane elastomer on a steel plate and observing the height of rebound. The low rebound of the isocyanurate-polyisocyanurate derived material indicates it has superior energy absorbing properties.

C. Abrasion-Resistance

Weight loss in Abrasion of Polyurethane Elastomer

| Polyisocyanate | |
|---|---|
| PAPI | 172 mg/5000 cycles |
| Isocyanurate-Polyisocyanate | 83 mg/5000 cycles |

The abrasion of the elastomers was carried out according to ASTM D1044 applying a 1,000 gram load to a CS–17 wheel for 200 and 500 cycles and measuring the weight loss. The abrasion-resistance of the isocyanurate-containing elastomer is seen to be significantly greater.

EXAMPLE XV

Rigid Urethane Foam from Isocyanurate-containing Polyisocyanate

Formulation (parts by wt):

| | |
|---|---|
| Voranol RS–410 (Dow) | 50 |
| Poly–G 435 DM (Olin Chemicals) | 50 |
| Freon 11B | 46 |
| Dabco R-8020 (Houdry) | 2 |
| Tetramethyl Guanidine (American Cyanamid) | 0.2 |
| Dimethylethanolamine (Union Carbide) | — |
| Niax Catalyst D-22 (Union Carbide) | 0.6 |
| Surfactant 195 (Dow Corning) | 2 |
| Isocyanurate-containing Polyisocyanate* | 140 |
| Isocyanate Ratio | 1.05 |

*Prepared from chloromethylated toluene by a procedure similar to that of Example X. The free isocyanate content is 5.5 meg/g (23.1 percent by weight NCO groups), equivalent to an average $p$ of 0.73. (assuming the molecular weight of the chloromethylated toluene to be 189.)

Preparation:

The polyols, surfactant, catalysts, and freon are mixed in a container. The isocyanate component is mixed in and the mixture is quickly poured into a mold. The foam rises and sets in about 30 minutes.

Foam Properties:

| | Isocyanurate-Polyisocyanate Foam |
|---|---|
| Color | White |
| Density, lb/ft³ | 1.9 |

A similar foam prepared from a commercial polyisocyanate (Upjohn's PAPI) was considerably darker in color than the isocyanurate-containing polyisocyanate derived foam.

EXAMPLE XVI

Moisture-cured Urethane Coating from Isocyanurate-containing Polyisocyanate

Formulation (parts by wt.):

Charge I

| | |
|---|---|
| 1,3-Butylene glycol | 8.4 |
| Polypropylene glycol 1025 | 96.9 |
| Trimethylol propane | 12.9 |
| Cellosolve acetate | 95.1 |
| Xylol | 77.1 + 17.0 (excess to remove $H_2O$) |

Charge II

| | |
|---|---|
| Isocyanurate-containing Polyisocyanate* | 190.5 |
| Xylol | 18.0 |
| Dibutyltin dilaurate | 0.45 ml |
| Lead naphthenate, 24% | 0.45 ml |

*Prepared from chloromethylated toluene by a procedure similar to that of Example X. The free isocyanate content is 6.02 meq/g, equivalent to an average $p$ of 0.55. (assuming the molecular weight of the chloromethylated toluene to be 189.¹)

Procedure:

Charge I is dehydrated at a temperature of 150° C for 45 minutes, distilling off the excess xylol after all of the water has been removed. Charge II is heated to 150° F and Charge 1 is added to it over a period of 30 minutes. The formulation is then held at 150° F for an additional 4 ½ hours. The product is brought to 50 percent nonvolatile content by the addition of a 1:1 mixture of cellosolve acetate and xylol.

Film Properties

The product is applied to steel panels and cured. A commercial moisture-cured urethane (Spenkel M-21) is similarly evaluated for comparison.

| Properties | Isocyanurate-Polyisocyanate Coating | Spenkel M-21 |
| --- | --- | --- |
| Speed of Dry | | |
| Set to touch (min.) | 10 | 10 |
| Zapon free (hrs.) | 0.4 | 3.0 |
| Tack free " | 0.5 | 3.0 |
| Dry hard " | 0.6 | 3.0 |
| Dry thru " | 0.7 | 3.0 |
| Film Hardness | | |
| Sward, 1 day (%) | 34 | 18 |
| Sward, 7 days " | 34 | 18 |
| Hoffman, 7 days (gm) | 700 | 300 |

The data clearly establish that the isocyanurate-containing polyisocyanurate yields a moisture-cured coating formulation which dries more rapidly and has increased hardness over the control.

EXAMPLE XVII

Uralkyd from Isocyanurate-containing Polyisocyanate

Components:

A glyceride is prepared by heating a mixture of 430 g linseed oil, 264 g dipenta-erythritol, 826 g soya fatty acids, and 0.7 g lime to 235-250°C for a period of 4.5 hours. The acid number of the product is 2.1.

An isocyanurate-containing polyisocyanate is prepared from chloromethylated toluene by a procedure similar to that of Example X. The free isocyanate content is 6.26 meq/g, equivalent to an average $p$ of 0.48.

Formulation:

| Component | Parts by Weight |
| --- | --- |
| Linseed-soya glyceride | 780 |
| Isocyanurate-Polyisocyanate | 225 |
| Dibutyltin dilaurate | 1 |
| Xylol | 100 |
| Mineral spirits | 570 |

Procedure:

A reaction vessel is charged with the polyisocyanate, xylol, and 35 percent of the glyceride at ambient temperature. Other additions are made according to the schedule below.

| Time (Hrs.) | Temp (°C) | Action and Result |
| --- | --- | --- |
| 0 | 22 | Initial glyceride addition completed and dibutyltin dilaurate added. |
| 0.5 | 47 | Heating to 70°C initiated |
| 2.0 | 70 | 30 parts of the glyceride added |
| 2.5 | 70 | 50 parts of the mineral spirits added. Continuous addition of the remaining glyceride begun. |
| 2.9 | 70 | Add 300 parts mineral spirits |
| 3.2 | 70 | Glyceride addition complete Add remaining mineral spirits |
| 4.2 | 70 | Free isocyanate no longer detectable. Product cooled to 50° and 2 ml methanol is added. The uralkyd formulation is then filtered. |

The isocyanurate-polyisocyanate derived uralkyd is evaluated concurrently with a commercial urethane alkyd (Spenkel F-77) for comparison. The coating properties are obtained by applying each product to steel panels and air drying.

| Property | Isocyanurate-Polyisocyanate Alkyd | F-77 |
| --- | --- | --- |
| Formulation Applied: | | |
| Viscosity (Gardner Scale) | D-F | D-F |
| Color | 37 | 5 |
| Non-volatile (%) | 6 | 50 |
| Cobalt Naphthenate, 6% | 47 | 0.01 |
| (% of non-volatile) | 0.06 | 0.01 |
| Zirconium Octoate, 6% | 0.20 | — |
| Speed of Drying | | |
| Set to touch (min.) | 1 | 30 |
| Tack free (hrs) | 2.7 | 4.5 |
| Dry hard " | 2.7 | 4.5 |
| Dry thru " | 2.7 | 4.5 |
| Hardness | | |
| Sward, 1 day (%) | 10 | 18 |
| Sward, 7 days " | 22 | 30 |
| Hoffman, 7 days (gm) | 400 | 400 |
| Color Retention (1 week UV Exposure) | | |
| Initial Color | 0.09 | 0.06 |
| Exposed Color | 0.21 | 0.28 |
| Change in Color | 0.12 | 0.22 |
| Water Immersion (158°F) | | |
| Blistering (ASTM Scale) | 10 | 10 |
| Whitening " | 10 | 10 |
| Loss of gloss " | 9 | 8 |
| Durability (500 hrs exposure in Weatherometer | | |
| Checking (ASTM Scale) | 8 | 10 |
| Cracking " | 10 | 10 |
| Gloss (60°) | 83 | 92 |

It can be seen that the isocyanurate-polyisocyanate derived alkyd dries faster and gives superior color retention without sacrificing other performance properties.

EXAMPLE XVIII

Flexible Foam from an Isocyanurate-containing Polyisocyanate

Formulation (parts by wt):

| | |
| --- | --- |
| Fomrez No. 50 (Witco) | 70 |
| Water | 2.8 |
| Silicone Surfactant L-5340 (Union Carbide) | 2.1 |
| Dibutyltin dilaurate | 0.42 |
| EMI-24 (Houdry) | 1.4 |
| Isocyanurate-containing Polyisocyanate * | 70 |

* Same as used in Example XV.

Preparation:

The components are mixed together for 20 seconds. The mixture rises and sets to form a flexible foam with a density of 2.9 lb/ft$^3$. This foam shows improved color stability as compared to a similar flexible foam prepared from a commercial diisocyanate (tolylene diisocyanate (TDI). The TDI foam assumes a yellow appearance upon standing for a few days, whereas the isocyanurate-polyisocyanate foam remains white.

What is claimed is:

1. A process for the preparation of polymers containing isocyanurate rings comprising the steps of (a) preparing polyisocyanate compounds containing isocyanurate rings by reacting organic dichlorides selected from the class consisting of

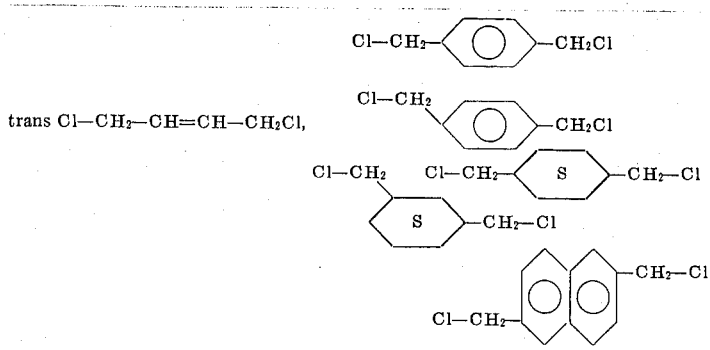

trans Cl—CH₂—CH=CH—CH₂Cl, and the dichlorides of tetramethylene, pentamethylene, hexamethylene, heptamethylene, octamethylene, or lower alkyl derivatives thereof, which are free from substituents which interfere with the reaction of the present invention, with a cyanate of a metal selected from the group consisting of Li, Na, K, Rb, Cs, Ca, Mg, and Be, in the conjoint presence of an alkali metal bromide or iodide or an alkaline earth metal bromide or iodide catalyst and an aprotic solvent which is liquid under the conditions of the reaction, which has a dielectric constant greater than about 15 at 25° C, which is dipolar so that one part of the molecule has a more positive electrical charge relative to the other parts of the molecule causing the molecule to act as a dipole, which is sufficiently inert not to enter into deleterious side reactions to a significant degree under reaction conditions, and which does not possess hydrogen atoms capable of hydrogen bonding with or transferring to ions in solution in the reaction mixture, or mixtures of such aprotic solvents, wherein the reaction is conducted at a temperature of from about 25° to about 300° C, wherein the mole ratio of metal cyanate to the chloride in the organic dichloride is from about 0.8 to about 1.5, and wherein about 5 to 100 moles of solvent are present for each mole of dihalide starting material; subsequently (b) reacting all of the said polyisocyanate compounds with an active hydrogen compound having at least 2 active hydrogens or mixtures of such active hydrogen compounds.

2. The process of claim 1 wherein the reaction of the said polyisocyanate compounds with said active hydrogen compound is conducted in the presence of a blowing ager to form a foam.

3. A foam produced by the process of claim 1 wherein the active hydrogen compound is a hydroxyl-containing polyester and is reacted with the polyisocyanate in the presence of a blowing agent.

4. A flame retardant rigid foam produced by the process of claim 2 wherein the active hydrogen compound is a hydroxyl-containing polyester and is reacted with the polyisocyanate in the presence of a fluorocarbon foam blowing agent.

5. A polymer foam comprising the reaction product of an active hydrogen compound having at least 2 active hydrogens selected from the group consisting of polyamines, polyalcohols, polyamides, polyurethanes, polybiurets, polymercaptans, polycarboxylic acids, polyethers, and polyesters and a mixture of organic polyisocyanates comprising compounds having the structure:

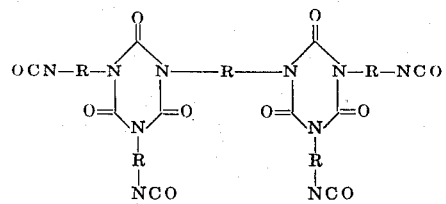

where R is selected from the class consisting of:

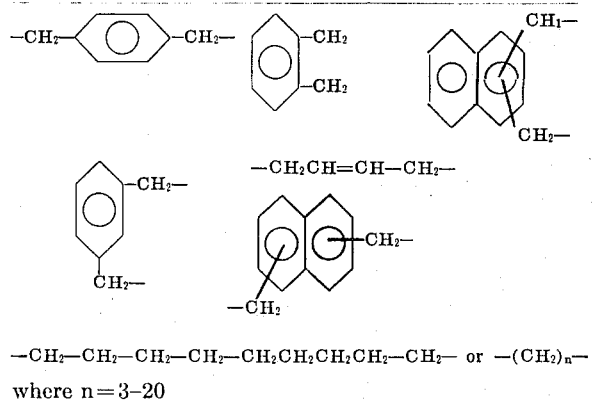

—CH₂—CH₂—CH₂—CH₂—CH₂CH₂CH₂CH₂—CH₂— or —(CH₂)ₙ— where n=3–20

—CH₂—CH=CH—CH₂—CH₂—O(CH₂—CH₂—CH₂)₂

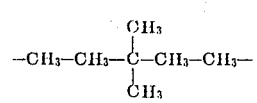

$$-CH_3-CH_3-\underset{\underset{CH_3}{|}}{\overset{\overset{CH_3}{|}}{C}}-CH_3-CH_3-$$

tetramethylene, pentamethylene, hexamethylene, heptamethylene, octamethylene, or lower alkyl derivatives of the foregoing and wherein there are no nitrogen to nitrogen bonds.

6. The polymer foam of claim 5 wherein the active hydrogen compound comprises a polyamine.

7. The polymer foam of claim 5 wherein the active hydrogen compound comprises a polycarboxylic acid.

8. The polymer foam of claim 5 in which the active hydrogen compound is a polyether or a polyester.

9. A polymer foam comprising the reaction product of an active hydrogen compound having at least 2 active hydrogens selected from the group consisting of polyamines, polyalcohols, polyamides, polyurethanes, polybiurets, polymercaptans, polycarboxylic acids, polyethers, and polyesters and a mixture of organic polyisocyanates comprising compounds having the structure:

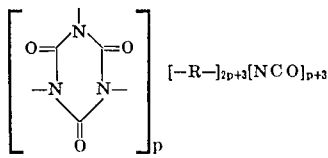

where R is selected from the class consisting of:

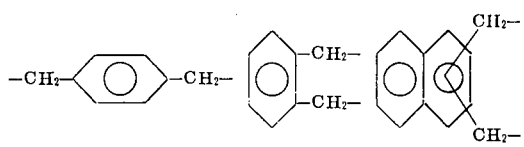

$-CH_2-CH_2-CH_2-CH_2-CH_2-CH_2-CH_2-CH_2-$ or $-(CH_2)_n-$ where $n = 3-20$ $-CH_2-CH=CH-CH_2-CH_2-O(CH_2-CH_2-CH_2)_2$ $-CH_2-\langle S \rangle-CH_2-$  $-CH_3-CH_3-\underset{CH_3}{\overset{CH_3}{C}}-CH_3-CH_3-$ tetramethylene, pentamethylene, hexamethylene, heptamethylene, octamethylene, or lower alkyl derivatives of the foregoing and wherein there are no nitrogen to nitrogen bonds.

* * * * *